United States Patent
Zaydman et al.

(10) Patent No.: US 10,275,363 B2
(45) Date of Patent: Apr. 30, 2019

(54) CUCKOO CACHING

(71) Applicant: VMWARE, INC., Palo Alto, CA (US)

(72) Inventors: Oleg Zaydman, San Jose, CA (US); Preeti Kota, Sunnyvale, CA (US)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 15/693,129

(22) Filed: Aug. 31, 2017

(65) Prior Publication Data

US 2019/0065403 A1 Feb. 28, 2019

(51) Int. Cl.
| | |
|---|---|
| *G06F 12/00* | (2006.01) |
| *G06F 12/123* | (2016.01) |
| *G06F 12/0817* | (2016.01) |
| *G06F 12/0891* | (2016.01) |
| *G06F 17/30* | (2006.01) |

(52) U.S. Cl.
CPC ........ *G06F 12/123* (2013.01); *G06F 12/0824* (2013.01); *G06F 12/0891* (2013.01); *G06F 17/3033* (2013.01); *G06F 2212/1024* (2013.01)

(58) Field of Classification Search
CPC ............... G06F 12/123; G06F 12/0824; G06F 12/0891; G06F 17/3033
See application file for complete search history.

(56) References Cited

U.S. PATENT DOCUMENTS

2015/0370720 A1 12/2015 Rowlands et al.
2018/0011852 A1* 1/2018 Bennett ............... G06F 17/3033

OTHER PUBLICATIONS

Bin Fan, David G. Andersen, Michael Kaminsky, Michael D. Mitzenmacher, "Cuckoo Filter: Practically Better Than Bloom", CoNEXT'14, Dec. 2-5, 2014,Sydney, Austrailia.
BitcoinCore.Org "Bitcoin Core 0.14.0 Released with Performance Improvements", Mar. 8, 2017. https://bitcoincore.org/en/2017/03/08/release-0.14.0/.
Justin Connell "New Bitcoin Caching Features Could Improve Block Verification", Feb. 5, 2017, https://news.bitcoin.com/new-bitcoin-cachin-features-oould-improve-block-verification/.

* cited by examiner

*Primary Examiner* — Gurtej Bansal
(74) *Attorney, Agent, or Firm* — Clayton, McKay & Bailey, PC (57) ABSTRACT

A cuckoo cache has plural buckets of plural cells each. The cells within a bucket are ranked to approximate relative usage recency. New items can be inserted into empty cells; when a bucket is full, room for a new item can be made by laterally transferring an older item to an alternative bucket. When empty cells and lateral transfers are unavailable, an item is selected for eviction based on the usage recency rank of the containing cell. When a match is found, depending on the embodiment, the hit item can be promoted within its bucket, to its alternative bucket, or to a separate tier of the cuckoo cache. The items can be key-value pairs. No metadata is required to track usage recency so that the cuckoo cache can be a very space efficient tool for finding cached values by their keys.

20 Claims, 6 Drawing Sheets

CUCKOO CACHING

BACKGROUND

Herein, a "cache" is a data storage medium with relatively short access times that is used for storing copies of data in a "mass" storage medium with relatively long access times. A system using the data can achieve performance benefits by accessing copies of data from the cache instead of the mass storage medium. In many uses cases, the capacity of the cache is too limited to hold copies of all data required by the system. Accordingly, the performance gain provided by a cache is related to the likelihood that copies of data being accessed are found in the cache. Thus, once a cache is full, some eviction strategy is needed to ensure that the data most likely to be accessed is retained while data least likely to be accessed is evicted to make room for new data. Commonly used strategies evict the "least recently used" (LRU) or the "least frequently used" (LFU) data from the cache.

DETAILED DESCRIPTION

The present invention introduces a "cuckoo cache", examples of which achieve space efficiency by obviating a need for metadata to be stored in the cache. Typical caches store, along with the copies of data the host system needs to access, metadata to keep track of the usage of cached entries so that the LRU and LFU eviction strategies can be implemented. The additional capacity required to store the usage data can be, in some sense, costly. For example, if the storage capacity is strictly limited, the capacity allocated to metadata comes at the expense of room for more cached data. By obviating the need for usage metadata, the present invention uses available capacity more efficiently; for example, so that less storage capacity is needed to store a given amount of data to be accessed, or so that more data to be accessed can be stored in a cache of a given size.

The cuckoo cache is an array of "buckets"; each bucket has a unique index value determined by its position in the cuckoo cache array (so that the index value does not need to be stored in the cache). Each entry in the cuckoo cache is a key-value pair. Each new entry is written to one of plural, typically two, buckets to which it is assignable. The buckets to which an entry may be assigned can be calculated as a function of a key.

When every cell of a bucket contains an entry, the bucket is said to be full. Storing a new item in a full bucket requires that an entry already in the bucket be evicted from the cache or moved another bucket to which it is assignable. In general, it is desirable to retain data entries as long as possible before they are evicted from the cuckoo cache. Accordingly, when a new item is entered into to a full bucket, another entry in the bucket can usually be moved to its alternative bucket. If the alternative bucket is full, one of its existing entries can be displaced to its alternative bucket, and so on until an entry is moved to an a bucket with an empty cell. This shifting of entries not only prolongs the average lifetime of an entry in the cuckoo cache, but also tends to use the available storage capacity efficiently.

In general, there are more possible addresses than there are buckets in the cuckoo cache. As a result, more than one address may be represented in a bucket. However, due to the hash functions used to determine the assignable buckets, it is unlikely that two different data values will be assigned to the same pair of buckets. Thus, in some embodiments, a new or shifted data entry displaces an entry in the same bucket with a different data value if there is one. However, if both buckets to which a data entry is assignable are full with data entries having the same data value, one of the entries must be evicted.

Within a bucket, the cells are ranked. Typically, a new data entry is written either to the highest rank cell or at least to a cell for which there are no higher ranked non-empty cells in the same bucket. As noted above, it is generally desirable to retain data entries as long as possible before they are evicted from the cuckoo cache. For this reason, a new entry is initially entered into the less full of its alternative buckets, assuming they are not equally full. If they are equally full, the selection of which assignable bucket is to initially store the entry can be random or based on some other criterion.

While, data entries may be moved from cell-to-cell within a bucket, the least-recently used data entry tends to be located in the lowest priority cell. If a data entry is to be evicted, it is the contents of the lowest rank cell that are evicted. Since the invention does provide for some exceptions in the ranking of data entries, the present invention can be conceptualized as employing a modified least-recently used (LRU) eviction strategy.

Figure 1:
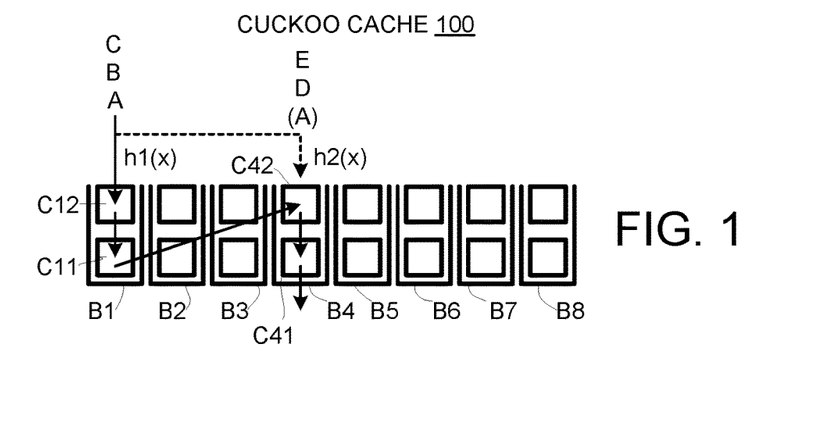
FIG. 1 is a schematic diagram of a cuckoo cache having two cells per bucket.

For example, a cuckoo cache 100, shown in FIG. 1, includes buckets B1-B8, each with an upper "more-recently used" (MRU) cell, e.g., cell C12 and a lower "less recently used" (LRU) cell, e.g., C11. More typical values would call for a large number (hundreds, thousands, millions, etc.) of buckets and about four cells per bucket. FIG. 1 depicts a data item A that is assignable to buckets B01 and B04 based on hash functions h1(x) and h2(x), which can be the same as those disclosed by Bin Fan et al. (ibid), e.g., as applied to the data value.

Initially, item A is inserted into the top cell C12 of bucket B1, but is moved to bottom cell C11 of bucket B1 to make room for item B. In a variation, item A is inserted initially into the bottom cell C11 (which is the lowest empty cell at the time) of bucket B1, and remains there as item B is inserted into the top cell (which is the lowest empty cell at the time) of bucket B1. Item A is then moved from bottom cell C11 of bucket B1 to the top cell C42 of bucket B4 to make room for item C in bucket B1. Item B is moved to cell C11 from cell C12, and item C is inserted into cell C12. Item A is then moved to cell C41 so that item D can be inserted into cell C42. Then item A is evicted from bucket B4 and from cache 100 so that item D can be moved to cell C41 and new item E can be inserted into cell C42. Thus, an item may enter into and be evicted from a bucket other than its original bucket.

Alternatively, eviction of item A can be avoided or delayed by moving it back to bucket B1, displacing an item from bucket B1 to its alternate bucket. The displacing can continue until an item is displaced into a bucket with available space or until some criterion is met that calls for eviction of an item. This displacing of items to alternate buckets helps ensure a relatively uniform distribution of items across buckets of a cuckoo cache.

Figure 2:
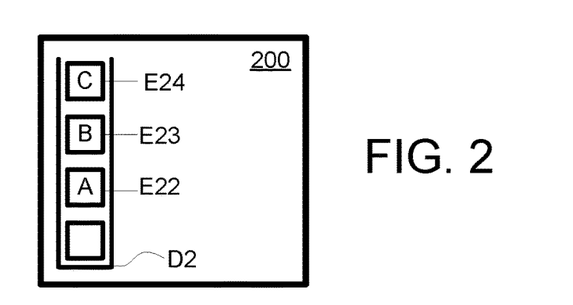
FIG. 2 is a schematic diagram of a cuckoo cache in which new items are inserted into the top cell of a bucket.
Figure 3:
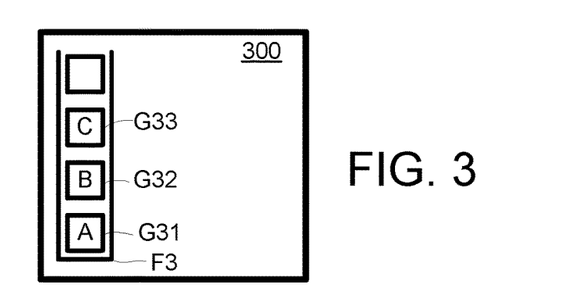
FIG. 3 is a schematic diagram of a cuckoo cache in which new items are inserted into the lowermost empty cell of a bucket (unless the bucket is full).

FIGS. 2 and 3 represent alternative approaches to inserting a new item into a bucket D2 of a cache 200 so that the entries are properly ordered by usage recency. In FIG. 2, new items are inserted into the top cell E24 and are "pushed down" as new items are inserted. Thus, item A, which was inserted first is at cell E22, has migrated from cell E24 to cell E23 to cell E22. Item B was inserted after item A, and item C was inserted after item B. FIG. 3 depicts a cuckoo cache 300 with a bucket F3. Item A was initially inserted into bottom cell G31 of bucket F1. Item B was inserted into the lowest empty cell G32. Item C was inserted into the then lowest empty cell G33.

Figure 4A:
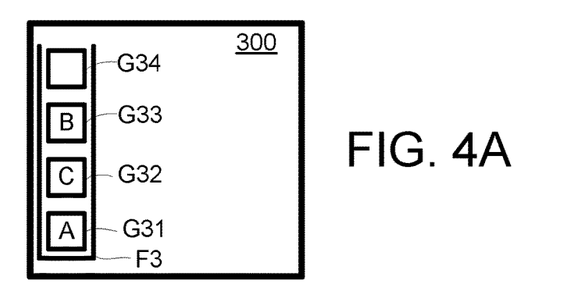
FIGS. 4A and 4B represent alternative approaches to handling a bit of item B given the scenario of FIG. 3.
Figure 4B:
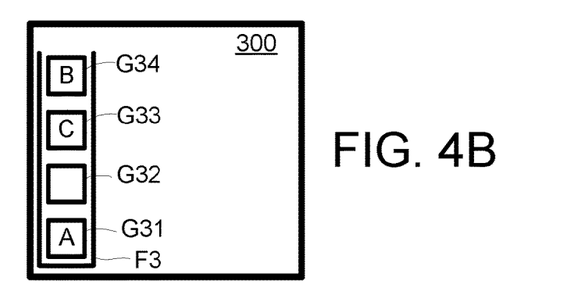

FIGS. 4A and 4B represent alternative approaches to handling a bit of item B given the scenario of FIG. 3. In FIG. 4A, in response to a hit of item B, item B has been moved to the top previously occupied cell G33, the previous occupant of that cell has been pushed down to cell G32, and the previous occupant of cell G32 has been pushed down to cell G31. When a new item is received, it can be inserted into top cell G34.

In FIG. 4B, in response to a hit of item B, item B has been moved to the top cell G34 of bucket 250. Top cell G34 was empty before, so items C and A can remain in the positions that they occupied in FIG. 3. When a new item is received, it can be entered into cell G33, moving item C down to cell G32. In this case, an older hit item has a higher retention priority than a more recently received new item. Depending on the application, it may be appropriate to consider a hit a more weighty recent use than a new entry.

When an item is moved from one bucket to another to make room for a new item in the source bucket, the item can be moved laterally to preserve its relative usage recency. Herein, a "lateral" move is a move from a first cell of a first bucket to a second cell of a second bucket, wherein the first and second cells have the same rank (e.g., represent the same usage recency). For example, in FIG. 5, two buckets U1 and U2 are shown before, during, and after insertion of a new item Z into bucket U2. Prior to the insertion, cells V11, V12, and V13 of bucket U1 contain items P, O, and K respectively; cell V14 is empty. Cells V21, V22, V23, and V24 contain items A, L, F, and D respectively.

Figure 5:
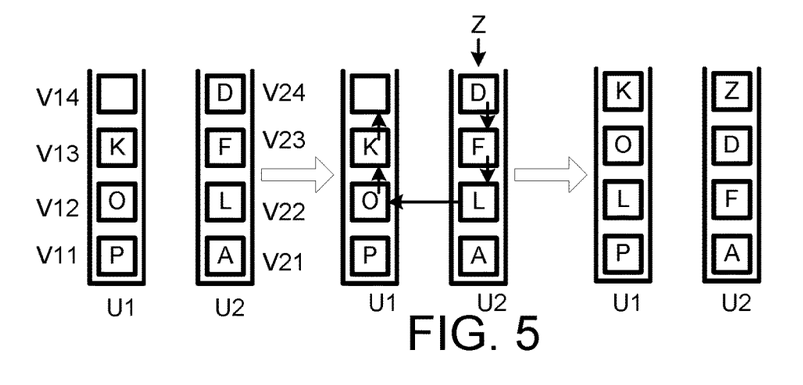
FIG. 5 represents a lateral transfer of an item from one bucket to an alternate bucket.

Bucket U1 is the alternate bucket for item L; since bucket U1 has an empty cell, it makes sense to move item L to bucket U1. However, moving item L from cell V22 to cell V14 would have the effect of promoting item L to a higher usage recency than it would otherwise merit. Accordingly, L is transferred laterally to cell V12, which has the same usage frequency as cell V22.

To make room for L at V12, items O and K are promoted up one cell each, e.g., item O is promoted from cell V12 to V13 and item K is promoted from cell V13 to cell V14. While items K and O may seem to "benefit" from the higher usage-frequency placement within a bucket, this benefit is offset by the bucket losing one empty space. The next entry inserted into bucket U1 where would push K and O down into their original positions, whereas it would simply fill the empty space at the top otherwise. Finally, item L remains at the same usage recency level as before the insertion of item Z.

Figure 6A:
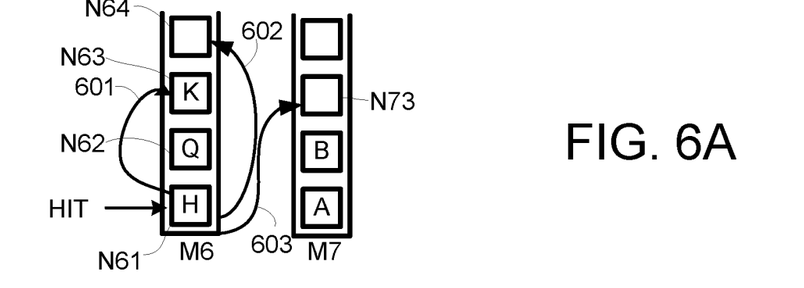
FIGS. 6A-D represent alternative ways of promoting an item that has been matched (hit).

FIGS. 6A-D represent different approaches to handling a hit, i.e., when a new item shares a key value with an item already in the cuckoo cache. FIG. 6A represents three approaches. A cuckoo cache 600 includes a bucket M6, which initially includes an item H at a lowest cell N61, an item Q at a next higher cell N62, and an item K at a next higher cell M63. The top cell N64 is empty. Upon a hit, item H can be rotated to the top occupied cell N63, as indicated by arrow 601, or to the top cell N64 of the bucket M6 as indicated by arrow 602, or to some cell N73 of the alternate bucket M7 for the hit item as indicated by arrow 603.

Figure 6B:
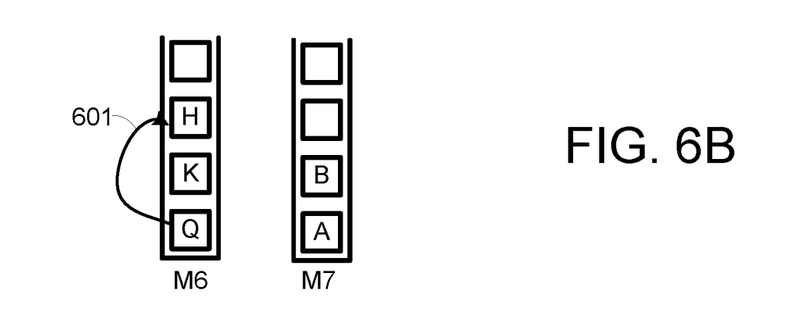
Figure 6C:
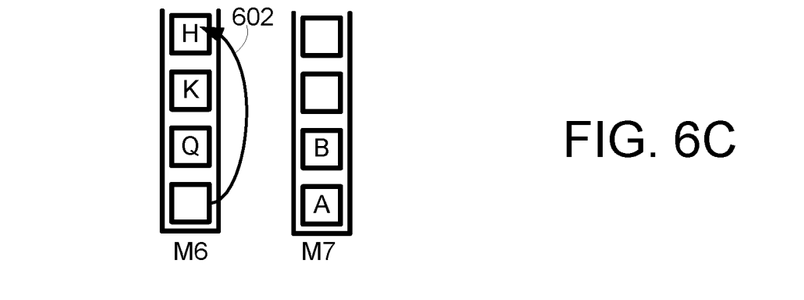
Figure 6D:
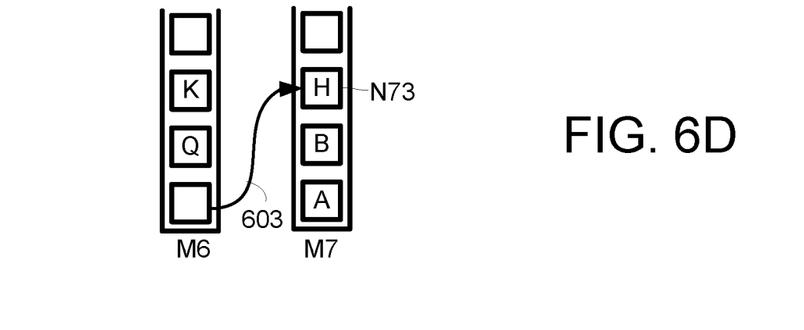

FIG. 6B shows the result of the rotation to the top occupied cell indicated by arrow 601. Item H has been promoted to cell N63, while item K has been pushed down to cell N62, and item Q has been pushed down to cell N61. FIG. 6C shows the result of moving a hit item H to the top cell N64 within a bucket M6 as called for by arrow 602. In this case, H is moved to cell N64, which was empty, so items K and Q can remain at their previous positions. FIG. 6D is an example to an item H being moved to its alternative bucket M7 in response to a hit. This can occur when the alternate bucket has more empty cells than the bucket in which the item resided when the hit occurred. Variants provide for different cells in the alternative buckets as the destination for the hit item.

Figure 7:
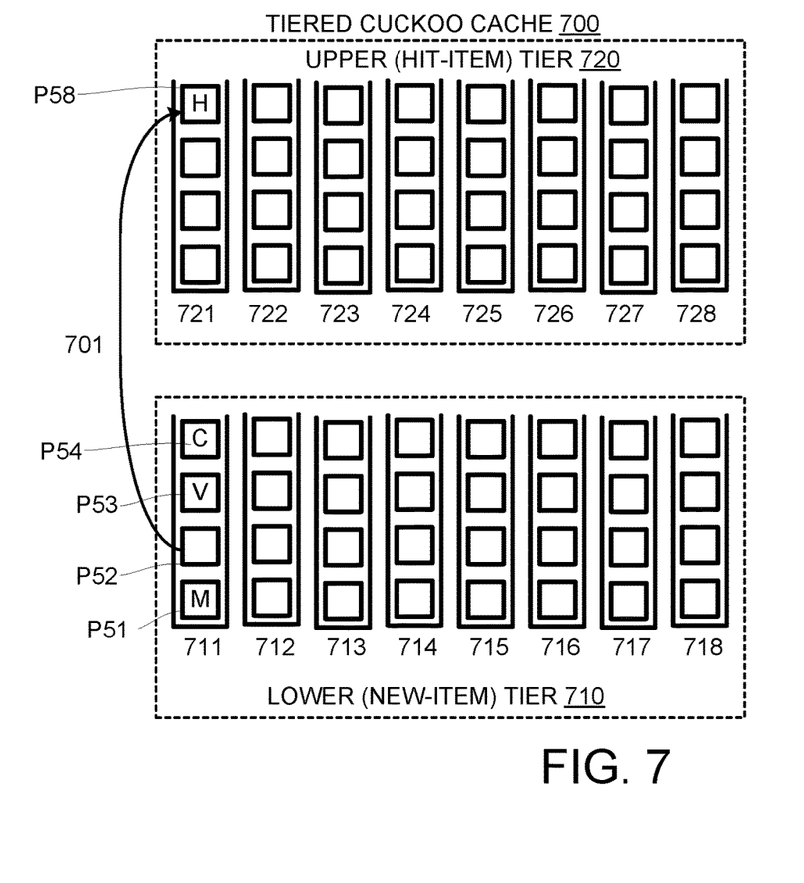
FIG. 7 is a schematic representation of a tiered cuckoo cache.

As mentioned, FIG. 6C and arrow 602 represent an emphasis on hit items in that an older hit item can be treated as if it were more recent use than a newer new item. However, additional new items might eventual push down the hit item, even though the newer items were never hit. FIG. 7 presents a tiered cuckoo cache 700 that allows hit items to retain their priority over items that have not been hit.

As shown in FIG. 7, a tiered cuckoo cache 700 includes a lower (new-item) tier 710 and an upper (hit-item) tier 720. Lower tier 710 includes buckets 711-718, while second tier 720 includes buckets 721-728. New items are entered into lower tier 710 initially. No new item is entered into the upper tier 720. Thus, at one time prior to that represented in FIG. 7, cells P51, P52, P53, and P54 are respectively occupied by items M, H, V, and C. Upon a hit of item H, item H is moved from cell P52 to cell P58 of bucket 721 of second tier 720. Once in upper tier 720, an item remains in the upper tier unless evicted to make room for another hit item. An advantage of tiered cuckoo cache 700 is that no item that has been hit at least once can be evicted by an item that has never been hit. Note that each item is assignable (under different conditions) to two pairs of buckets of cuckoo cache 700, two in lower tier 710 and two in upper tier 720.

Figure 8:
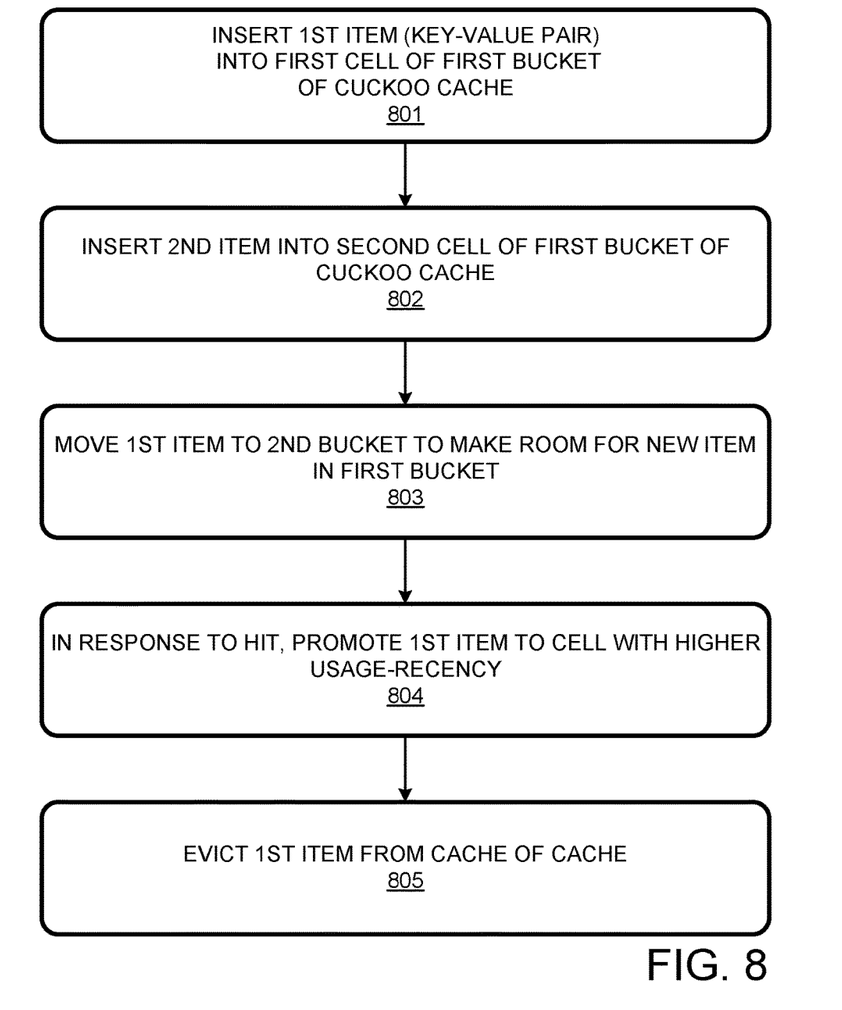
FIG. 8 is a flow chart of a cuckoo process implementable using the cuckoo caches represented in the previous figures and in other cuckoo caches.

A cuckoo caching process 800 implementable using cuckoo cache 100 and using other cuckoo caches is flow charted in FIG. 8. At 801, a first item is inserted into a first cell of a first bucket of a cuckoo cache. The item can be an address-contents (key-value) pair or other item. The cuckoo cache includes plural buckets with plural cells each. The cells are arranged in an order correlated with parameter related to usage recency. As noted above, some usage (e.g., a hit) may be weighted more heavily than other usage, e.g., a first instance of a key. The item is assignable to any one of plural buckets, including a first bucket and a second bucket; the item can be inserted into at most an empty one of the buckets to which it is assignable. There are also buckets, e.g., a third bucket to which the item cannot be assigned, but to which other items can be assigned.

In different variations, the first item may be initially inserted into different cells of a first bucket, e.g., a top cell (corresponding to maximum usage recency), a bottom cell (corresponding to least usage recency), or any intermediate cell. Also, the cell may have been vacant before the insertion of another item may have had to be moved or evicted to make room for the first item.

At 802, a second item is inserted into a second cell of the first bucket. The second cell may be the same as the first cell or a different cell. If it is the same as the first cell, then the first item will have been moved to a different cell of the same or a different bucket. In any case, the usage recency associated with the second item is greater than the usage recency associated with the first item at the time the second item is inserted. The second item is assignable to the first bucket and the third bucket, but not to the second bucket. In other words, while items may share an assignable bucket, it is highly unlikely that they would share two assignable buckets.

At 803, a third item is inserted into a cell of the first bucket while it is already full. To make room for the third item, the first item is moved to a cell in another bucket to which it is assignable, in this case, the second bucket.

At 804, in response to receipt of an item matching the first item, the first item is promoted from a cell associated with a relatively low usage recency to a cell associated with a relatively high usage recency. The cells may be in the same bucket or in different buckets. If the buckets are different, the latter bucket can be an alternate assignable bucket; in the case of a tiered cuckoo cache, the latter bucket can be in a different tier than the source bucket.

At 805 an item, e.g., a first key-value pair is evicted from the cuckoo cache to make room for a new item. The evicted item can be a low usage recency item from a cell in the bucket into which the new item is to be placed. Alternatively, the evicted item can be from a cell reached through one or more bumps starting from the cell into which the new item is inserted.

Cuckoo caching can be implemented in software and in hardware. For example, a computer system 900, shown in FIG. 9 embodies plural examples of cuckoo caching. Computer system 900 includes a processor 902, an external level L1 cache 904, main memory 906, and mass, e.g., disk, storage 908.

Figure 9:
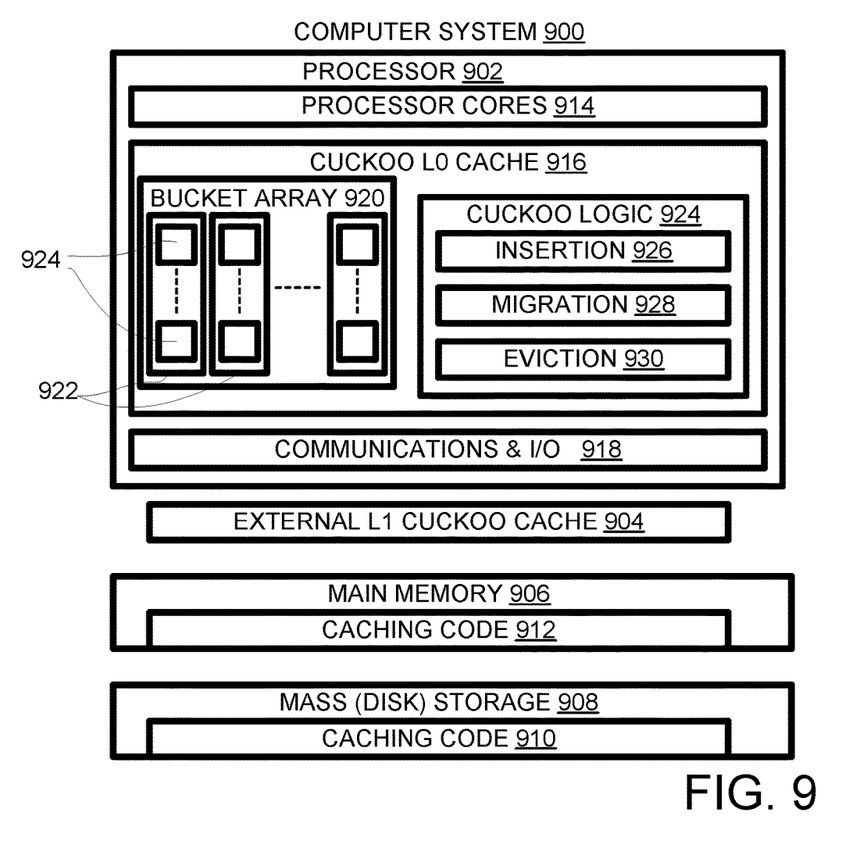
FIG. 9 is a schematic illustration of a computer system including hardware and software cuckoo caches.

Non-transitory storage 908 is encoded with caching code 910 that, when executed by processor 902, implements the process of FIG. 8 and thus a cuckoo cache. More specifically, caching code 901 can be launched and loaded into non-transitory main memory 906, whereby main memory 906 becomes encoded with caching code 912 that, when executed by processor 902, implements process 800.

Processor 902 is an integrated circuit that includes processor cores 914, a level zero (L0) cuckoo cache 916, and communications and input/output devices 918, e.g., a bus interface. Cuckoo cache 916 includes an array 920 of buckets 922, each of which has plural cells 924. The cells are ranked substantially based on usage recency. Bucket array 920 includes $2^{10}$ buckets with four cells each for a capacity of $2^{12}$=4096 items. Other numbers of buckets and cells per bucket are used in other examples.

Cuckoo cache also includes cuckoo logic circuitry 924, including insertion logic 926, migration logic 928, and eviction logic 930. Insertion logic 926 functions to determine which bucket and which cell is to store a new item. Migration logic 928 determines target buckets and cells for existing entries that are moved to make room for a new entry. Eviction logic 930 determines which entry is to be evicted in the case that eviction is required to make room for a new item.

Computer system 900 also includes a level 1 (L1) cuckoo cache 932 that is external to processor 902 and located functionally between processor 902 and main memory 906. Level-1 cuckoo cache 932 caches main memory contents directly, which level 0 cuckoo cache 916 caches main memory contents via level-1 cuckoo cache 932. The structure of level-1 cuckoo cache 932 is the same as that for level-0 cuckoo cache 916. However, the bucket array for the level-1 cache has $2^{16}$ buckets of four cells each, for a capacity of $2^8$ entries at any one time.

Herein, all art labelled "prior art", if any, is admitted prior art. Art not labelled "prior art" is not admitted prior art. The illustrated embodiments, modifications thereto, and variations thereupon are provided for by the present invention, the scope of which is defined by the following claims.

What is claimed is:

1. A cuckoo caching process comprising:
   inserting a first item into a first cell of a first bucket of a cuckoo cache, the cuckoo cache having plural buckets, each of the buckets having plural cells, for each bucket, the cells being arranged in an order corresponding to a usage recency-parameter, each cell containing either zero items or exactly one item, each item being assignable to each of a respective assignable set of plural buckets and being unassignable to each of a respective unassignable set of a majority of the buckets, the first item being assignable to the first bucket and a second bucket and not being assignable to a third bucket;
   inserting a second item into a second cell of the first bucket so that the second item is in a cell associated with a relatively more recent usage and the first item is in a cell associated with a relatively less recent usage, the second item being assignable to the first and third buckets and not being assignable to the second bucket;
   while the first bucket is full in that each of its cells is occupied by an item, moving the first item to a cell of the second bucket having a lower usage recency rank than cells of the second bucket containing more recently used items than the first item and a higher usage recency rank than cells of the second bucket containing less recently used items than the first item, and inserting a third item into a cell of the first bucket;
   in response to receipt of a fourth item equal to the first item, promoting the first item from a cell associated with a relatively low usage recency to a cell with a relatively high usage recency; and
   in response to receipt of a fifth item while the bucket containing the first item is full, evicting the first item from the cuckoo structure to make room for inserting the fifth item into the bucket vacated by the first item.

2. The process of claim 1 wherein the cuckoo structure has a first tier and a second tier, each item being initially inserted into the first tier and being switched to the second tier in the event of a hit.

3. The process of claim 1 including, upon a hit, transferring the hit item to the top cell of a bucket so as to leave an empty cell below the top cell, and, inserting a new item into the empty cell below the top cell holding the previously hit item.

4. The process of claim 1 wherein the moving the first item to a cell of the second bucket is a lateral move in that the cell of the second bucket has the same rank as the cell from which the first item is moved.

5. The process of claim 1 wherein each item is a key-value pair that has exactly two assignable buckets including a first respective assignable bucket and a second respective assignable bucket.

6. The process of claim 5 wherein a key-value pair is inserted into the less full bucket of its two assignable buckets in the event one of its two assignable buckets has more empty cells than the other of its two assignable buckets has.

7. The process of claim 5 wherein, in some cases, in the event of a hit, a key-value pair is promoted within a bucket and, in some other cases, in the event of a hit, a key-value pair is promoted from a cell in a first of its assignable buckets to a cell in a second of its assignable buckets.

8. The process of claim 7 items are moved within the second of the assignable buckets to allow the key-value pair to transfer to a cell having the same usage recency rank as the cell from which the key-value pair was moved.

9. The process of claim 7 wherein the some other cases include cases in which the second of its assignable buckets has more empty cells than the first of its assignable buckets.

10. A system comprising non-transitory media encoded with code that, when executed by a processor, implements a cuckoo caching process including:
inserting a first item into a first cell of a first bucket of a cuckoo cache, the cuckoo cache having plural buckets, each of the buckets having plural cells, for each bucket, the cells being arranged in an order corresponding to a usage-recency parameter, each cell containing either zero items or exactly one item, each item being assignable to each of a respective assignable set of plural buckets and being unassignable to each of a respective unassignable set of a majority of the buckets, the first item being assignable to the first bucket and a second bucket and not being assignable to a third bucket;
inserting a second item into a second cell of the first bucket so that the second item is in a cell associated with a relatively more recent usage and the first item is in a cell associated with a relatively less recent usage, the second item being assignable to the first and third buckets and not being assignable to the second bucket;
while the first bucket is full in that each of its cells is occupied by an item, moving the first item to a cell of the second bucket having a lower usage recency rank than cells of the second bucket containing more recently used items than the first item and a higher usage recency rank than cells of the second bucket containing less recently used items than the first item, and inserting a third item into a cell of the first bucket;
in response to receipt of a fourth item equal to the first item, promoting the first item from a cell associated with a relatively low usage recency to a cell with a relatively high usage recency; and
in response to receipt of a fifth item while the bucket containing the first item is full, evicting the first item from the cuckoo structure to make room for inserting the fifth item into the bucket vacated by the first item.

11. The system of claim 10 further comprising the processor.

12. The system of claim 10 wherein each item is a key-value pair that has exactly two assignable buckets including a first respective assignable bucket and a second respective assignable bucket.

13. The system of claim 12 wherein a key-value pair is inserted into the less full bucket of its two assignable buckets in the event one of its two assignable buckets has more empty cells than the other of its two assignable buckets has.

14. The system of claim 12 wherein, in some cases, in the event of a hit, a key-value pair is promoted within a bucket and, in some other cases, in the event of a hit, a key-value pair is promoted from a cell in a first of its assignable buckets to a cell in a second of its assignable buckets.

15. The system of claim 12 items are moved within the second of the assignable buckets to allow the key-value pair to transfer to a cell having the same usage recency rank as the cell from which the key-value pair was moved.

16. A cuckoo-cache system comprising:
an array of buckets, each of the buckets including plural cells, each of the cells having a capacity to contain an entry; and
cuckoo cache logic that implements a process including,
inserting a first item into a first cell of a first bucket of a cuckoo cache, the cuckoo cache having plural buckets, each of the buckets having plural cells, for each bucket, the cells being arranged in an order corresponding to a usage-recency parameter, each cell containing either zero items or exactly one item, each item being assignable to each of a respective assignable set of plural buckets and being unassignable to each of a respective unassignable set of a majority of the buckets, the first item being assignable to the first bucket and a second bucket and not being assignable to a third bucket;
inserting a second item into a second cell of the first bucket so that the second item is in a cell associated with a relatively more recent usage and the first item is in a cell associated with a relatively less recent usage, the second item being assignable to the first and third buckets and not being assignable to the second bucket;
while the first bucket is full in that each of its cells is occupied by an item, moving the first item to a cell of the second bucket having a lower usage recency rank than cells of the second bucket containing more recently used items than the first item and a higher usage recency rank than cells of the second bucket containing less recently used items than the first item, and inserting a third item into a cell of the first bucket;
in response to receipt of a fourth item equal to the first item, promoting the first item from a cell associated with a relatively low usage recency to a cell with a relatively high usage recency; and
in response to receipt of a fifth item while the bucket containing the first item is full, evicting the first item from the cuckoo structure to make room for inserting the fifth item into the bucket vacated by the first item.

17. The system of claim 16 wherein each item is a key-value pair that has exactly two assignable buckets including a first respective assignable bucket and a second respective assignable bucket.

18. The system of claim 17 wherein a key-value pair is inserted into the less full bucket of its two assignable buckets in the event one of its two assignable buckets has more empty cells than the other of its two assignable buckets has.

19. The system of claim 17 wherein, in some cases, in the event of a hit, a key-value pair is promoted within a bucket and, in some other cases, in the event of a hit, a key-value pair is promoted from a cell in a first of its assignable buckets to a cell in a second of its assignable buckets.

20. The system of claim 17 where items are moved within the second of the assignable buckets to allow the key-value pair to transfer laterally to a cell having the same usage recency rank as the cell from which the key-value pair was moved.

* * * * *